US012639475B2

(12) United States Patent
    Singh

(10) Patent No.: US 12,639,475 B2
(45) Date of Patent: May 26, 2026

(54) SECURE DISTRIBUTED NETWORK DEEP LEARNING APPARATUS

(71) Applicant: BANK OF AMERICA CORPORATION, Charlotte, NC (US)

(72) Inventor: Shailendra Singh, Thane West (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 276 days.

(21) Appl. No.: 18/143,656

(22) Filed: May 5, 2023

(65) Prior Publication Data

US 2024/0370587 A1 Nov. 7, 2024

(51) Int. Cl.
    *G06F 21/00* (2013.01)
    *G06F 21/44* (2013.01)
    *G06F 21/64* (2013.01)

(52) U.S. Cl.
    CPC .............. *G06F 21/64* (2013.01); *G06F 21/44* (2013.01)

(58) Field of Classification Search
    CPC ................................. G06F 21/44; G06F 21/64
    USPC ........................................................... 726/22
    See application file for complete search history.

(56) References Cited

U.S. PATENT DOCUMENTS

| | | | |
|---|---|---|---|
| 10,846,485 B2 | 11/2020 | Bacarella et al. | |
| 10,990,370 B1 | 4/2021 | Bawcom | |
| 11,063,759 B2 | 7/2021 | Kocsis et al. | |
| 11,164,105 B2 | 11/2021 | Sankaran et al. | |
| 11,244,032 B1 * | 2/2022 | Nguyen | G06F 9/547 |
| 11,348,029 B1 | 5/2022 | Turow et al. | |
| 11,494,171 B1 * | 11/2022 | Acharya | H04L 9/0861 |
| 11,574,234 B2 | 2/2023 | Zoldi et al. | |
| 11,604,986 B2 | 3/2023 | Amisano et al. | |
| 11,605,013 B2 | 3/2023 | Manamohan et al. | |
| 11,663,051 B2 | 5/2023 | Vasileiadis et al. | |
| 11,663,456 B2 | 5/2023 | Yehezkel Rohekar | |
| 2020/0027010 A1 | 1/2020 | Lorenc et al. | |
| 2020/0272945 A1 | 8/2020 | Manamohan et al. | |
| 2020/0401890 A1 | 12/2020 | Xu et al. | |
| 2022/0270421 A1 * | 8/2022 | Carter | B64U 80/25 |
| 2022/0283827 A1 | 9/2022 | Singh | |
| 2022/0366278 A1 | 11/2022 | Liu et al. | |
| 2023/0188600 A1 * | 6/2023 | Sulibhavi | H04L 9/50 709/224 |

(Continued)

FOREIGN PATENT DOCUMENTS

| | | | | |
|---|---|---|---|---|
| KR | 20240063309 A | * | 5/2024 | G06F 8/65 |

*Primary Examiner* — Josnel Jeudy
(74) *Attorney, Agent, or Firm* — Moore & Van Allen PLLC; Nicholas C. Russell

(57) ABSTRACT

Embodiments of the invention are directed to systems, methods, and computer program products for a secure distributed machine learning activity system using distributed ledger technology. The invention comprises an AI-ML model development de-centralized system that provides a secure mechanism which give secure provision to entities to develop AI-ML models in a distributed environment. The system allows the release of AI-ML model components, programs, binary files, and the like in distributed host system infrastructure in secure manner. Therefore, optimizing computer resources for various requirements, such as image processing or the like that may be performed on other secure mechanisms across the secure distributed network. In this way, distributing the AI-ML model across multiple devices across the secure distributed network.

20 Claims, 8 Drawing Sheets

(56) References Cited

U.S. PATENT DOCUMENTS

| | | | |
|---|---|---|---|
| 2023/0281604 A1* | 9/2023 | Robell | G06Q 30/018 |
| 2024/0184859 A1* | 6/2024 | Akkapeddi | G06F 3/06 |

* cited by examiner

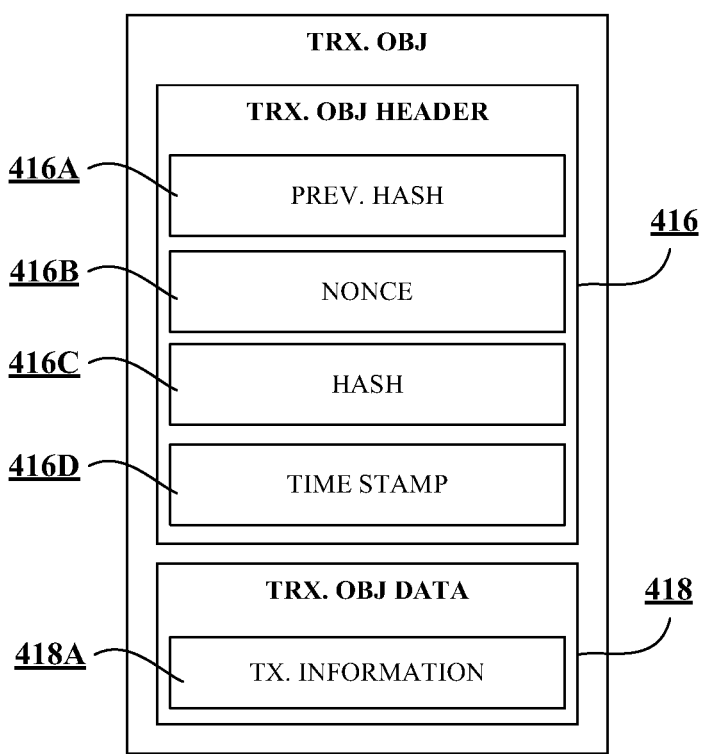
FIGURE 2B

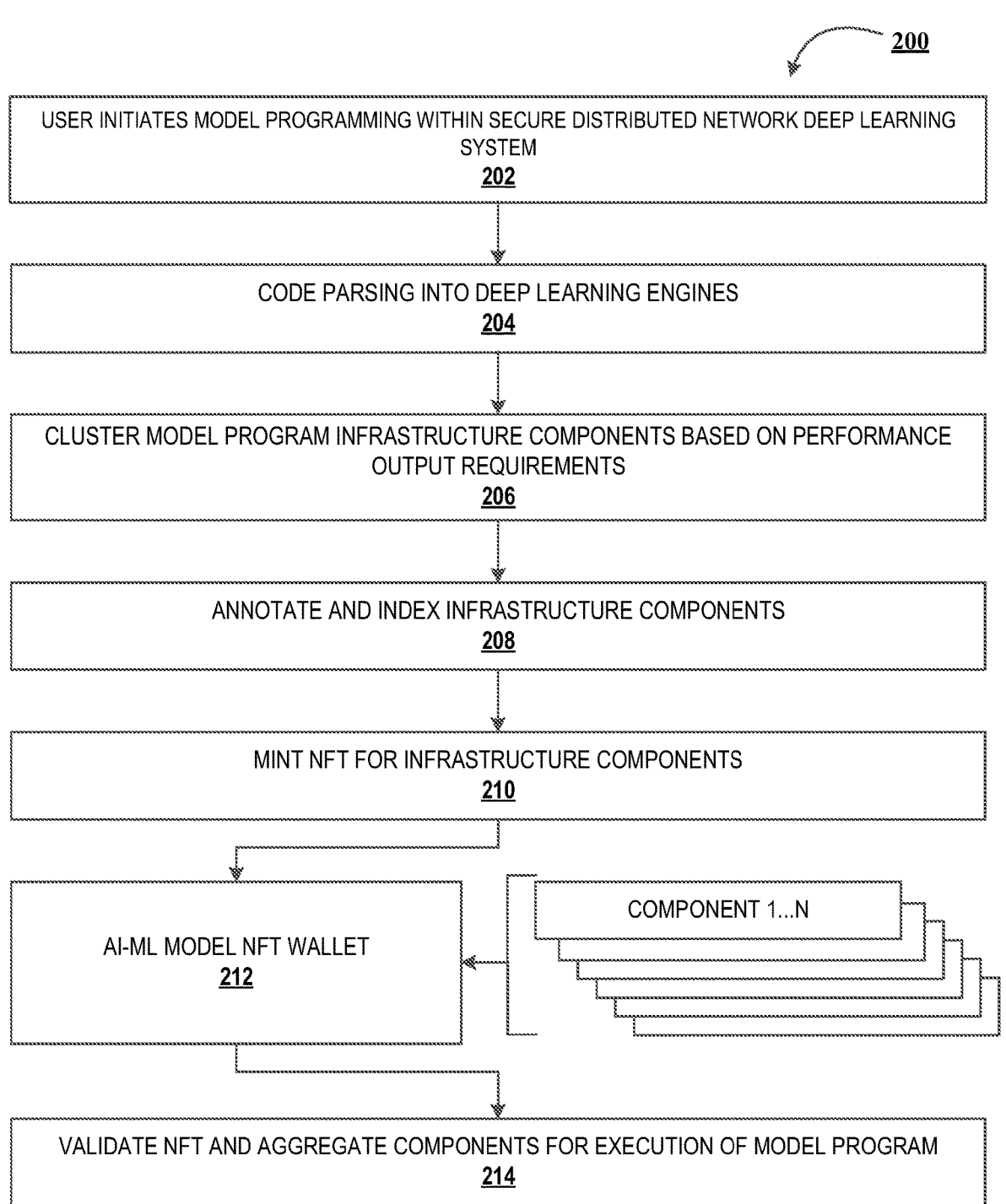

200

USER INITIATES MODEL PROGRAMMING WITHIN SECURE DISTRIBUTED NETWORK DEEP LEARNING SYSTEM
202

CODE PARSING INTO DEEP LEARNING ENGINES
204

CLUSTER MODEL PROGRAM INFRASTRUCTURE COMPONENTS BASED ON PERFORMANCE OUTPUT REQUIREMENTS
206

ANNOTATE AND INDEX INFRASTRUCTURE COMPONENTS
208

MINT NFT FOR INFRASTRUCTURE COMPONENTS
210

AI-ML MODEL NFT WALLET
212

COMPONENT 1...N

VALIDATE NFT AND AGGREGATE COMPONENTS FOR EXECUTION OF MODEL PROGRAM
214

FIGURE 3

SECURE DISTRIBUTED NETWORK DEEP LEARNING APPARATUS

BACKGROUND

As technology advances, deep learning that utilizes machine learning (ML) and artificial intelligence (AI) continues to allow users to developing various AI-ML models to automate intelligent decisioning. AI-ML model development and execution is a complex, computing resource driven activity requiring extensive infrastructure for managing and hosting complex machine learning models and the hardware associated therewith. As such, a need exists for a secure de-centralized infrastructure provisioning system to develop AI-ML models in a distributed environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the invention are directed to systems, methods, and computer program products for a secure distributed machine learning activity system using distributed ledger technology. Deep learning is a type of machine learning (ML) and artificial intelligence (AI) that imitates the way users gain certain types of knowledge. Deep learning is emerging technology, with entities continuing developing various AI-ML models to automate intelligent decisioning. AI-ML model development an execution is a complex, computing resource driven activity, in future AI-ML model development will be completely de-centralized as entities will not desire to maintaining infrastructure for managing and hosting complex machine learning models and the hardware associated therewith. Hence there is need to develop a secure mechanism which give secure provision to entities to develop AI-ML models in a distributed environment. The system allows the release of AI-ML model components, programs, binary files, and the like in distributed host system infrastructure in secure manner. Therefore, optimizing computer resources for various requirements, such as image processing or the like that may be performed on other secure mechanisms across the secure distributed network. In this way, distributing the AI-ML model across multiple devices across the secure distributed network. Later at point of use model components can be intelligently aggregated to give defined output in secure manner.

Embodiments of the invention are directed to systems, methods, and computer program products for a secure de-centralized execution of machine learning activity, the invention comprising: identifying machine learning and artificial intelligence (AI-ML) model components and clustering the AI-ML model components based on performance output requirements; annotating and indexing AI-ML model components; distributing the AI-ML model component to one or more host devices across a distributed network based on a performance output requirements match of the host devices and the AI-ML model component; minting a non-fungible token (NFT) for the AI-ML model component; receiving a request for an AI-ML model from a user;

identifying one or more AI-ML model components from an AI-ML component NFT wallet for the AI-ML model requested from the user; validating NFT and aggregating the one or more AI-ML model components for execution of model program at the host device; and connecting to a distributed ledger and extract AI-ML model components to assemble the AI-ML model.

In some embodiments, distributing the AI-ML model component to one or more host devices further comprises running the AI-ML model component on the host device using host device computer resources.

In some embodiments, distributing the AI-ML model component to one or more host devices further comprises distribution to the host device based on performance impact of the host device running the AI-ML model component.

In some embodiments, minting the NFT for the AI-ML model component further comprises tagging the AI-ML model component with the NFT for authentication and tampering verification.

In some embodiments, aggregating the one or more AI-ML model components for execution of model program at the host devices further comprises transmitting metadata about the AI-ML model, a binary file, and information about a target hardware to perform the AI-ML model component function on the host device.

In some embodiments, the AI-ML model component is one of one or more components in an AI-ML model.

In some embodiments, the distributed ledger comprises a string of NFTs to aggregate the AI-ML model components, AI-ML model programs, and AI-ML binary files in real-time for the AI-ML model performance.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
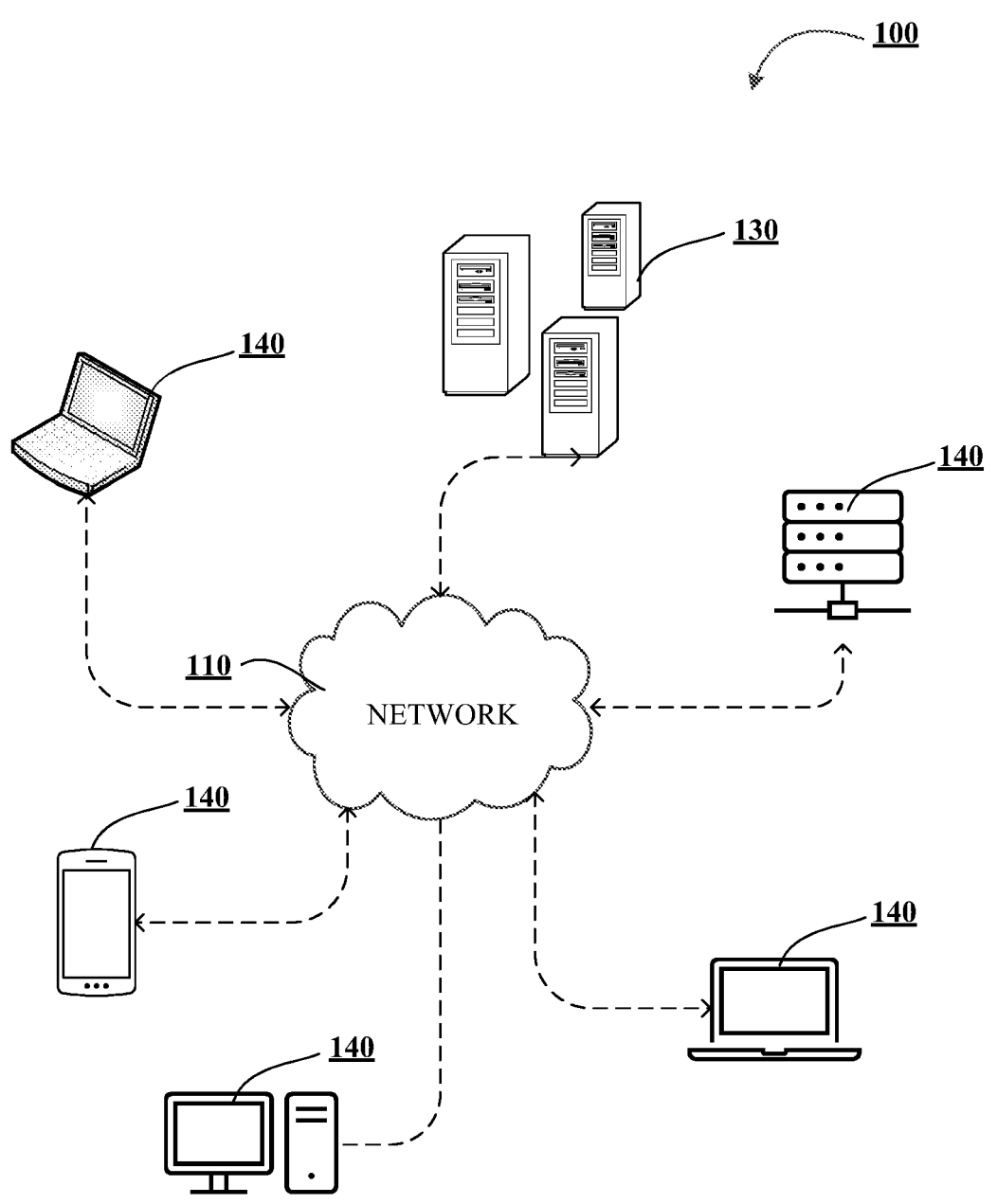
Figure 1B:
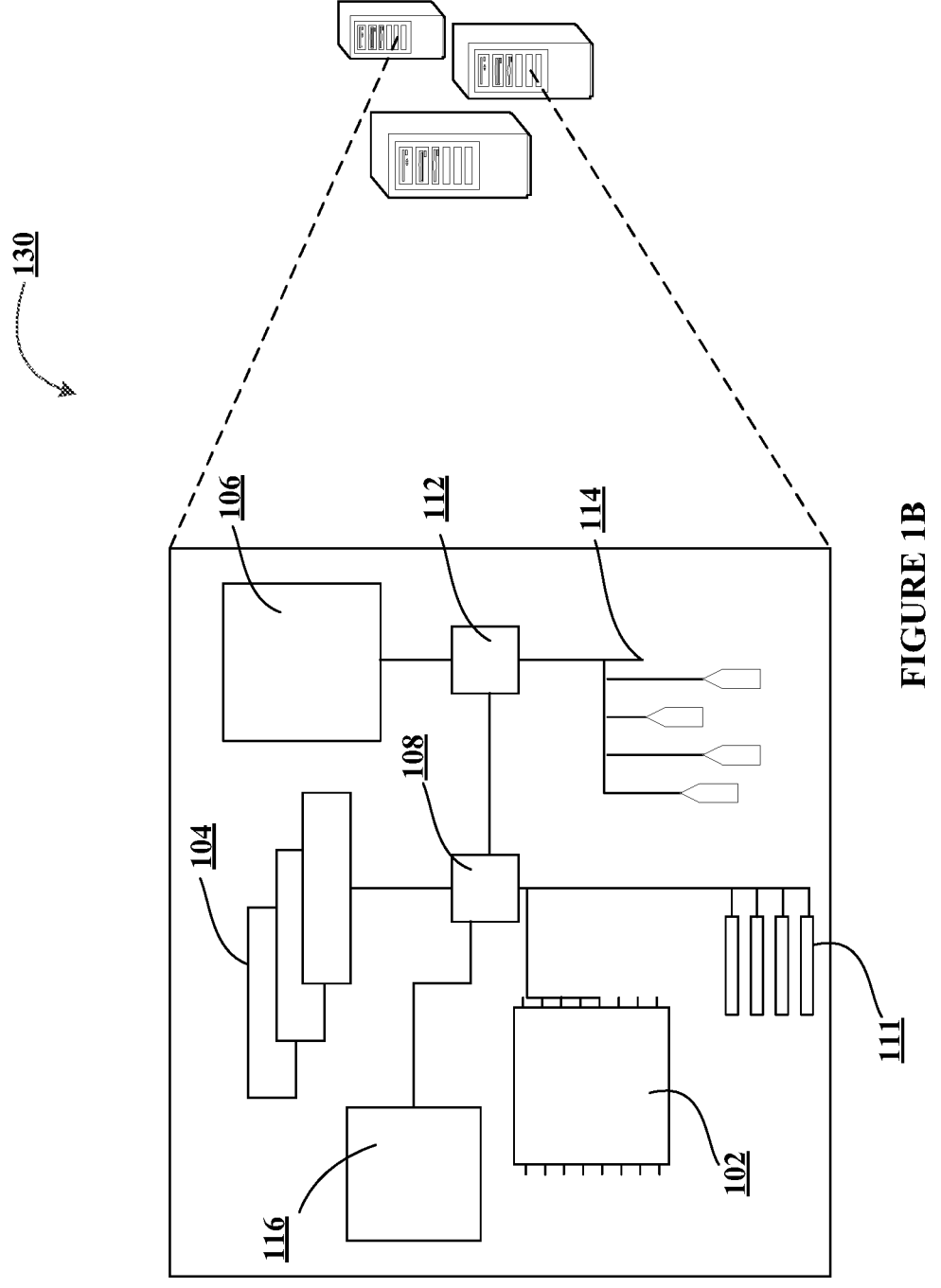
Figure 1C:
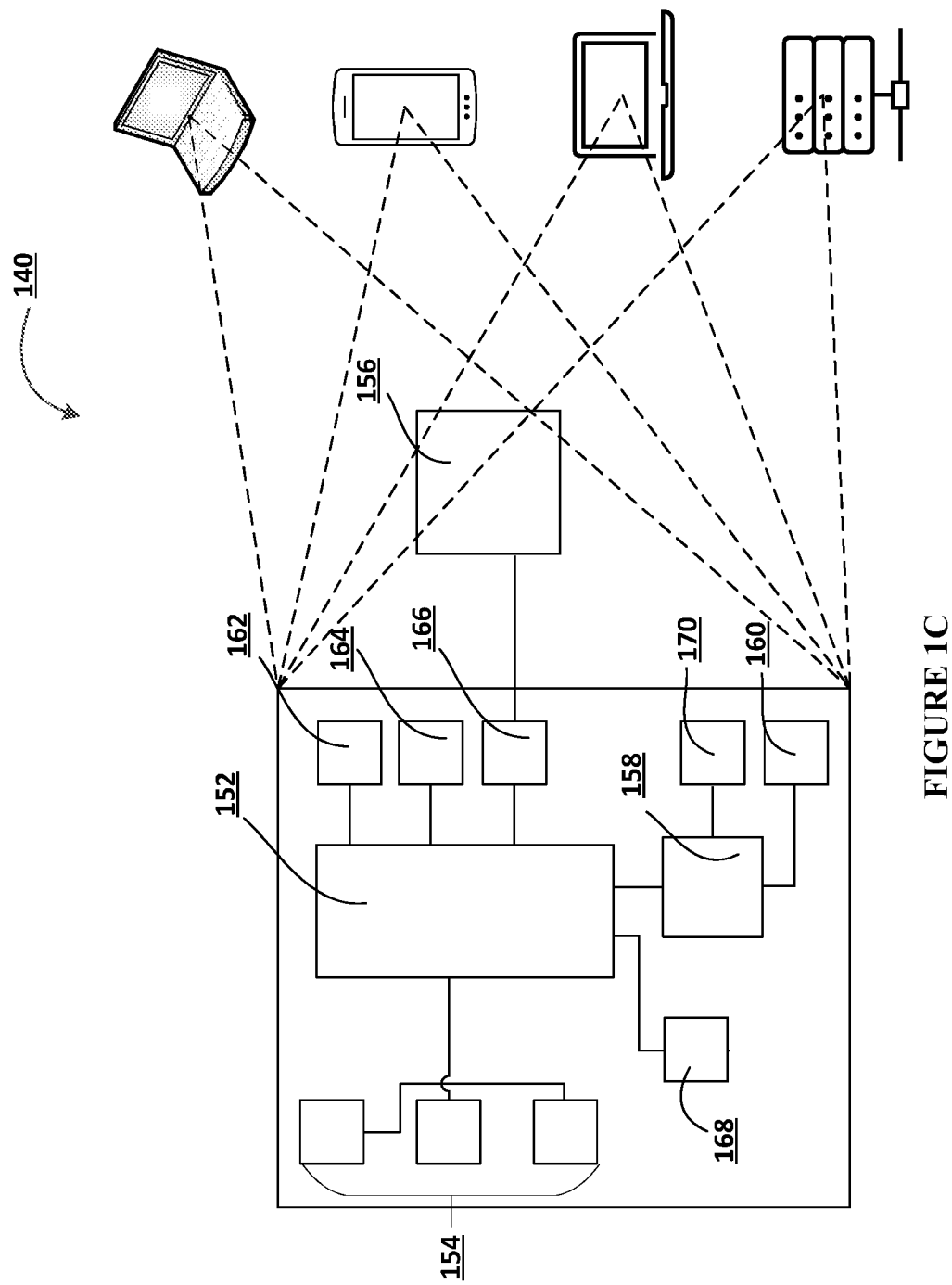
Figure 2A:
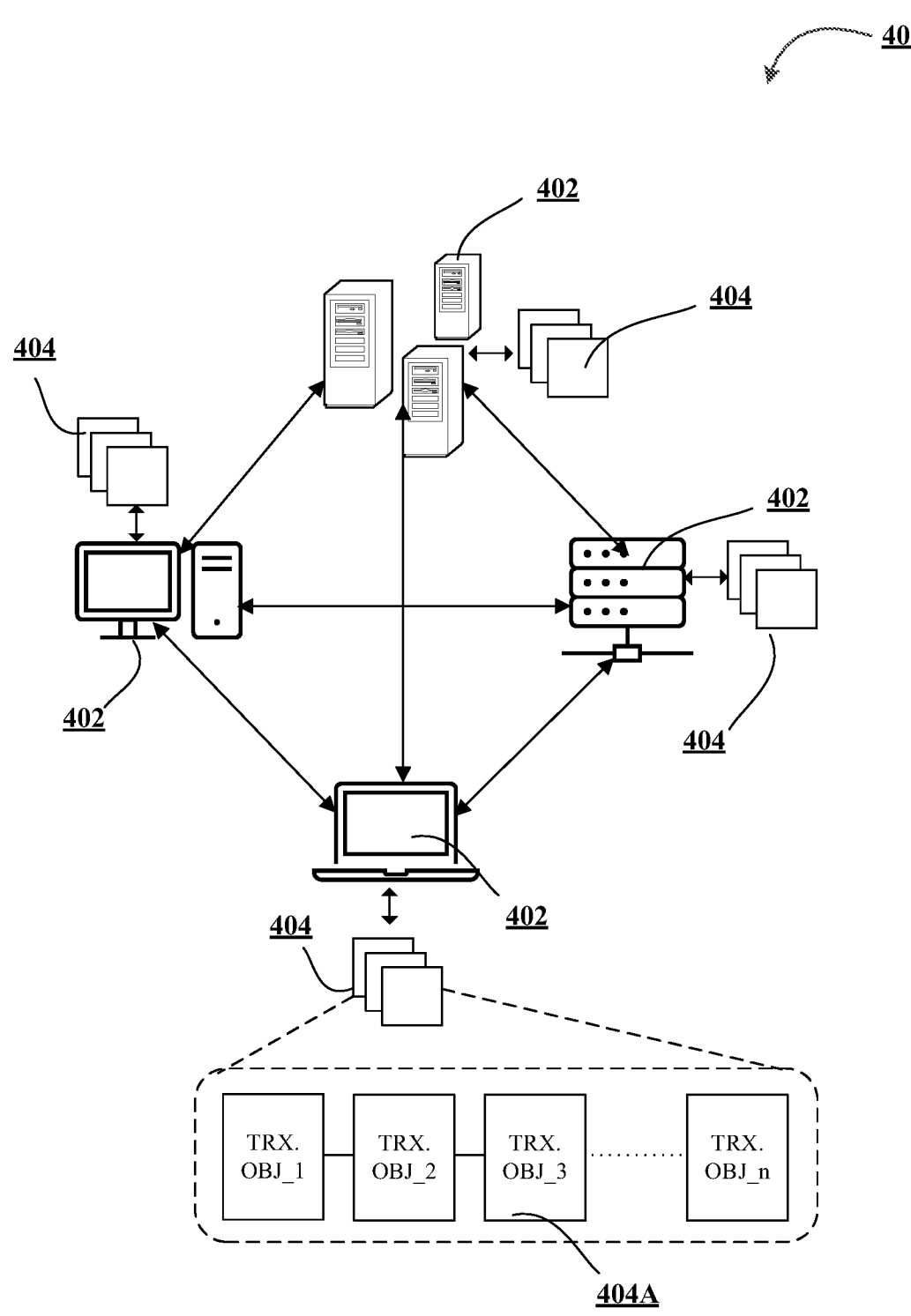
Figure 4:
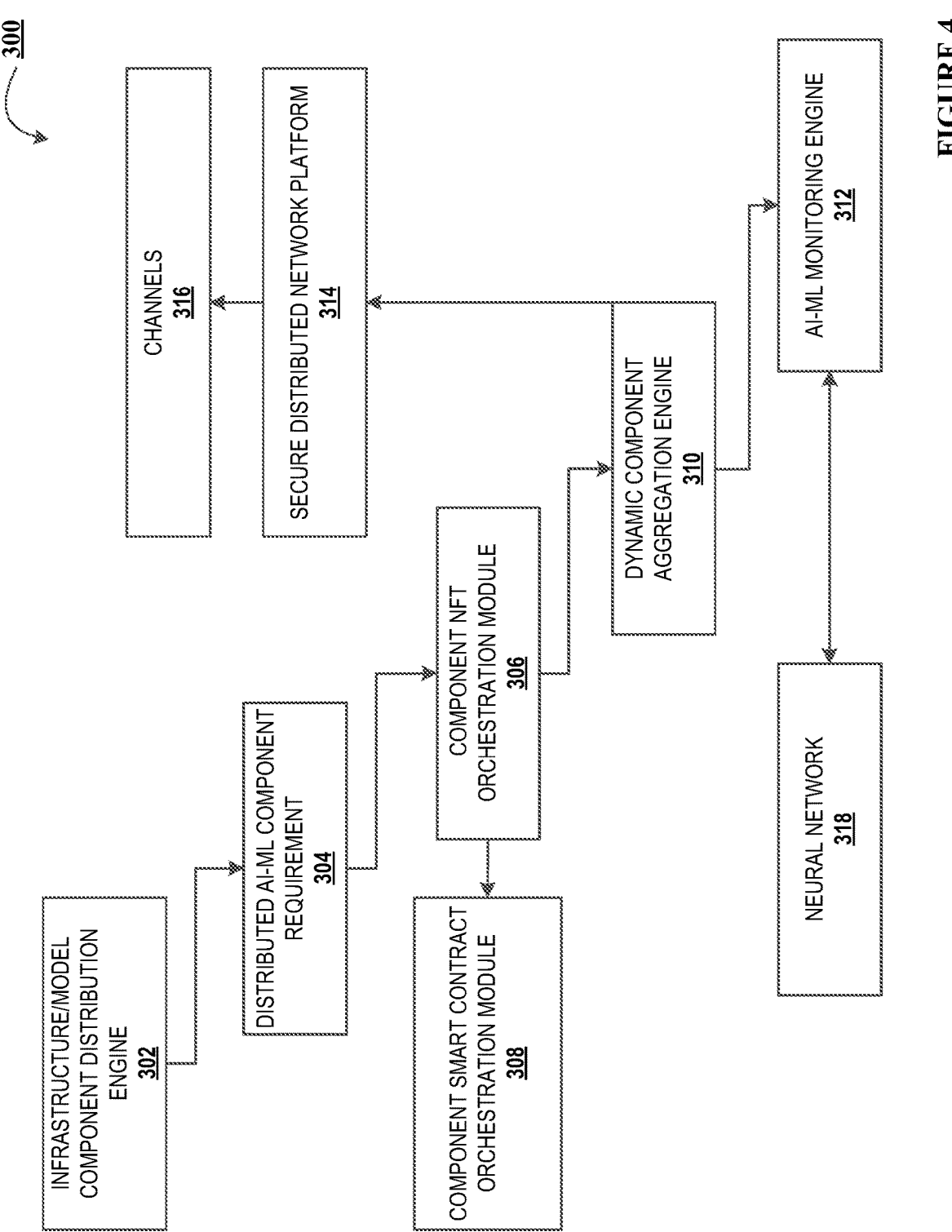
Figure 5:
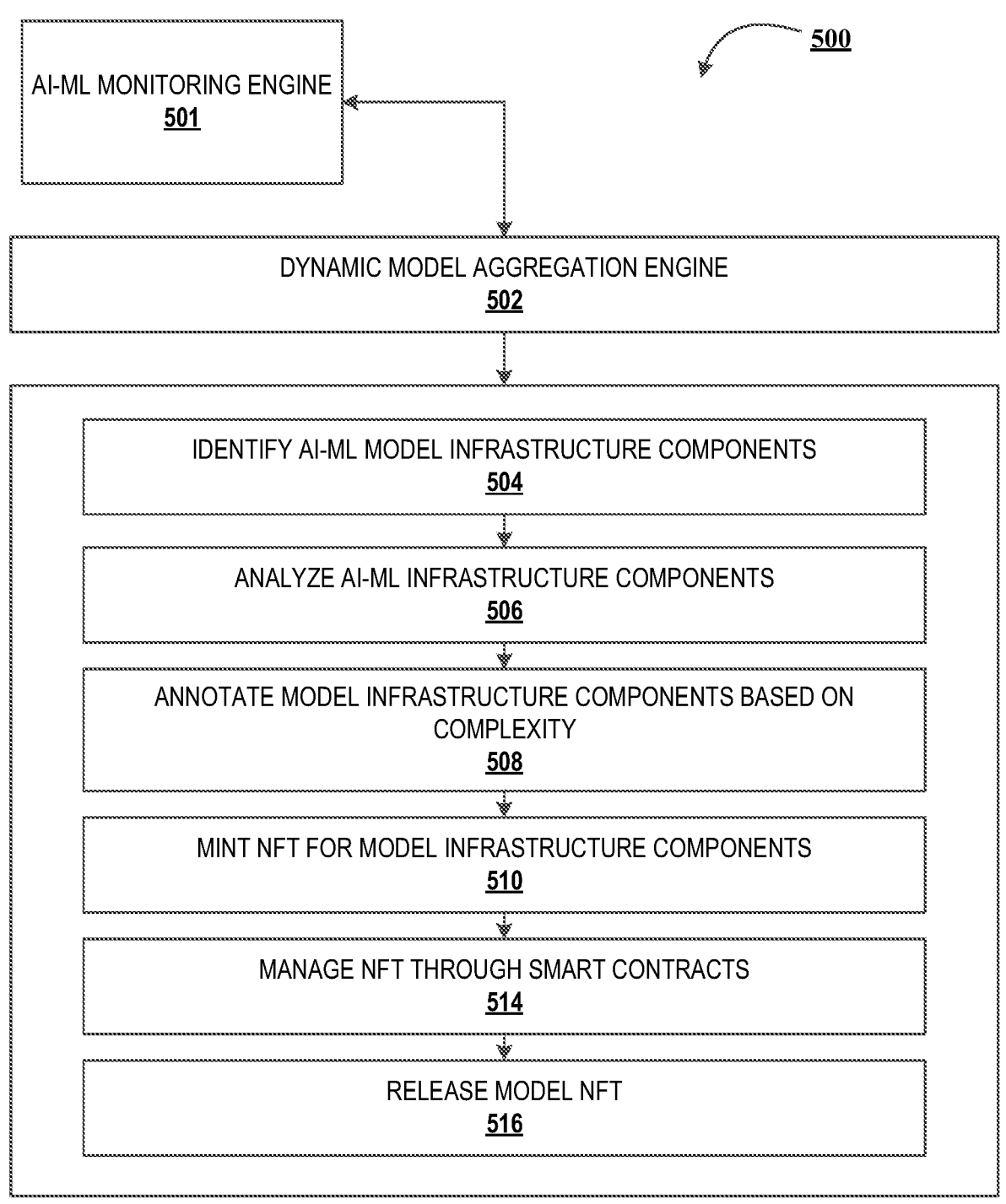

Having thus described embodiments of the invention in general terms, reference will now be made the accompanying drawings, wherein:

FIGS. 1A-1C illustrates technical components of an exemplary distributed computing environment for a secure distributed network deep learning process, in accordance with an embodiment of the invention;

FIGS. 2A-2B illustrate an exemplary distributed ledger technology (DLT) architecture associated with the secure distributed network deep learning process, in accordance with an embodiment of the invention;

FIG. 3 illustrates a process flow for distributing machine learning activity across a secure distributed network, in accordance with an embodiment of the invention;

FIG. 4 illustrates a process flow illustrating an aggregated model execution architecture, in accordance with an embodiment of the invention; and FIG. 5 illustrates a process flow illustrating model components for the secure distributed network deep learning system, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

The system allows the release of AI-ML model components, programs, binary files, and the like in distributed host system infrastructure in secure manner. Therefore, optimizing computer resources for various requirements, such as image processing or the like that may be performed on other secure mechanisms across the secure distributed network. In this way, distributing the AI-ML model across multiple devices across the secure distributed network. Later at point of use model components can be intelligently aggregated to give defined output in secure manner.

The distributed network can be used to aggregate the model to confirm the model components are original and have not been tampered with. During development of AI-ML model program, the system will intelligently select optimal infrastructure for model components and deploy components in target host infrastructure or end-point device. Entire mechanisms are managed in a distributed blockchain ledger. Model components are then analyzed at run time during development and indexed or annotated automatically based on performance output expectation. Each component is then minted using non-fungible tokens (NFT) that are controlled by smart contracts. To execute the entire AI-ML model through the distributed ledger infrastructure, each model aggregation point will be validated to the NFT associated with the AI-ML model.

The system creates a distributed model that identifies devices within the network that have higher capabilities and execute the results on those devices then aggregate the results across the network to other systems where they are targeted to be used. Each model is combination of multiple infrastructure components which are performing different actions. For example, one component may be understanding images, such as check images for misappropriation or the like. This component of the model may include resource centered activity requiring neural networks to understand data in pixels, convert the data to vectors and parse that data into an algorithm for misappropriation identification. Each component within the system may be performing one or more complex operations and requiring computing resources to do so.

The system may distribute the infrastructure components across the network to optimize the computing resources across the network. The system comprises a mechanism to securely distribute the components of the AI-ML deep learning model using a distributed network and allow them to be retrieved for processing. An NFT is used to validate and aggregate the infrastructure components for any specific model created using the AI-ML deep learning for a modeling purpose. The NFT comprises metadata about a particular program or binary file and along with information about the target hardware to process the information.

In some embodiments, the invention may be used to manage distributed AI-ML model development. The system may be used to manage and orchestrate computing infrastructure for AI-ML model execution. The system may also be used to secure ownership of AI-ML models in a distributed development environment. Finally, the system may be used to validate AI-ML model components that is assembled to run an end-to-end model created by opensource teams. In this way, the system creates an aggregated AI-ML model components network at a point of application in a secure way to optimize infrastructure resource consumption.

FIGS. 1A-1C illustrate technical components of an exemplary distributed computing environment for a secure distributed network deep learning process 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. The end-point device(s) 140 may comprise one or more user or entity devices on the secure distributed network that utilize or build AI-ML models on the system environment.

The system 130 may represent various forms of servers, such as web servers, database servers, file server, or the like and creates a secure distributed network deep learning apparatus for end-point device 140 use to create, develop, and maintain AI-ML models for automated intelligent decisioning.

The end-point device(s) 140 may represent various forms of electronic devices, including user input devices such as personal digital assistants, cellular telephones, smartphones, laptops, desktops, and/or the like. The end-point device(s) 140 may comprise one or more user or entity devices on the secure distributed network that utilize or build AI-ML models on the system environment.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low-speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low-speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other to create a secure distributed network deep learning apparatus.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources for AI-ML model access.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary DLT architecture, in accordance with an embodiment of the invention. The system provides for an intelligent technical procedure to aggregate AI-ML deep learning model components, programs, binary files, and the like at a point of application in secure manner. This allows the system to optimize infrastructure resource consumption for model building or data processing. The system utilizes distributed ledger technology (DLT) with non-fungible tokens (NFT) to aggregate model components and ensures proof of ownership on aggregated model components. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2B, the exemplary DLT architecture 400 includes a distributed ledger 404 being maintained on multiple devices (nodes) 402 that are authorized to keep track of the distributed ledger 404. For example, these nodes 402 may be computing devices such as system 130 and client device(s) 140. One node 402 in the DLT architecture 400 may have a complete or partial copy of the entire distributed ledger 404 or set of transactions and/or transaction objects 404A on the distributed ledger 404. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, the exemplary DLT architecture 410 includes an exemplary transaction object 414A may include a transaction header 416 and a transaction object data 418. The transaction header 416 may include a cryptographic hash of the previous transaction object 416A, a nonce 416B-a randomly generated 32-bit whole number when the transaction object is created, cryptographic hash of the current transaction object 416C wedded to the nonce 416B, and a time stamp 416D. The transaction object data 418 may include transaction information 418A being recorded. Once the transaction object 414A is generated, the transaction information 418A is considered signed and forever tied to its nonce 416B and hash 416C. Once generated, the transaction object 414A is then deployed on the distributed ledger 414. At this time, a distributed ledger address is generated for the transaction object 414A, i.e., an indication of where it is located on the distributed ledger 414 and captured for recording purposes. Once deployed, the transaction information 418A is considered recorded in the distributed ledger 414.

FIG. 3 illustrates a process flow for distributing machine learning activity across a secure distributed network 200, in accordance with an embodiment of the invention. As illustrated in block 202, a user initiates model programming within the secure distributed network deep learning system. In this way, a user, such as a developer, may initiate model programming in an editor environment. The code may then be parsed into deep learning engines, as illustrated in block 204. These engines are further described below in FIG. 4.

Next, as illustrated in block 206, the process 200 continues by performing cluster model program components based on performance outputs. In this way, the system provides a unique mechanism wherein auto-selected model components based on performance output are packaged to mint non fungible tokens managed by smart contract hosted in blockchain network. The clustering of model components based on performance parameters allows for components to be distributed on various host infrastructure based on complexity and performance impact. The model components, programs, and binary files are packaged and distributed to a host distributed environment in a way to optimize performance of aggregated model.

As illustrated in block 208, the process 200 continues by annotating and indexing the components for host environment distribution. The system may mint an NFT for the components, as illustrated in block 210. Minting component NFT ensures proof of ownership of model components and have metadata information on host path where model component binary files/program is located. At point of use, the model aggregator program will connect to distributed ledger, validate the NFT, and extract model components to assemble final AI-ML model.

Next, as illustrated in block 212, the process 200 continues by generating and presenting an AI-ML model NFT wallet. The model wallet comprises all of the components for the final AI-ML model. There may be one component, two components, or N components for the final AI-ML model. The model components are analyzed at run time during development and indexed/annotated automatically based on performance output or expectation. As illustrated in block 214, the system may validate NFT and aggregate components for execution of the model program.

FIG. 4 illustrates a process flow illustrating an aggregated model execution architecture 300, in accordance with an embodiment of the invention. As illustrated in block 302 the infrastructure/model component distribution engine is presented. The components, which may be disclosed herein as model components or infrastructure components. The components are distributed across host devices or host environments based on the complexity of the components and the infrastructure resource utilization. The engine assigns component host environment location and distributes the components to the host environment. Model components, programs, and binary files are packaged and distributed to the host environment in a way to optimize performance of aggregated model.

As illustrated in block 304 the distributed AI-ML model component requirement is identified. In this way, the system identifies the infrastructure components needed for the specific AI-ML model. Each model is combination of multiple infrastructure components which are performing different actions. For example, one component may be understanding images, such as check images for misappropriation or the like. This component of the model may include resource centered activity requiring neural networks to understand data in pixels, convert the data to vectors and parse that data into an algorithm for misappropriation identification. Each component within the system may be performing one or more complex operations and requiring computing resources to do so. The distributed AI-ML models components may include one component, two components, or N components for building the AI-ML model. This provides an intelligent method where AI-ML deep learning Model components/programs/binary files are analyzed at run time during development and indexed/annotated automatically based on performance output or expectation to ensure resilience for end-to end model execution.

The component NFT orchestration module 306 is illustrated. The component NFT orchestration module uses distributed leger technology with NFT tagging to confirm the components are true components for the system and have not been tampered with. The NFT is used to validate and aggregate the infrastructure components for any specific model created using the AI-ML deep learning for a modeling purpose. The NFT comprises metadata about a particular program or binary file and along with information about the target hardware to process the information. A chain of NFTs that act as blueprint to aggregate deep learning model components/programs/binary files on demand ensuring optimized model performance on distributed hardware. The component smart contract orchestration module 306 comprises the smart contracts that enable the functionality of the components to perform the function on a host environment. In this way, a unique mechanism is provided for auto- selecting model components based on performance output are packaged to mint non fungible tokens managed by smart contract hosted in blockchain network Minted component NFT ensures proof of ownership of model components and have metadata information on host path where model component binary files or program is located. At point of use model aggregation engine 310 will connect to distributed ledger, validate NFT and extract model components to assemble final model.

Next, as illustrated in block 312, the system further provides an AI-ML monitoring engine. The monitoring engine monitors the component progress for each component part at the various host environments. In this way, the monitoring engine ensures utilization of computer processing at the host environment and each component performing the correct processing at the host environment. The monitoring engine is connected to a neural network 318 in to communicate with and perform monitoring of the host environments.

As illustrated, the system further comprises a secure distributed network platform 314. The platform allows users to select and use AI-ML models in real-time. These models may include misappropriation protection, segmentation, incident predictions, character reader identifications, or the like across various financial channels, such as automatic teller machines (ATM), branch locations, digital networks, point-of-transaction devices, credit transactions, person-to-person transactions, debit transaction, trades, or the like. Finally, the system may present the combined components in an AI-ML model. These may be presented to a user via various network channels 316. These may include mobile, chat, via an internal network, across a digital network, or the like.

FIG. 5 illustrates a process flow illustrating model components for the secure distributed network deep learning system 500, in accordance with an embodiment of the invention. As illustrated the dynamic model aggregation engine 502 may be linked to the AI-ML monitoring engine 501, that monitors model accuracy, the GPU, CPU, RAM, and network utilization from the host environment. The AI-ML monitoring engine further monitors the security features, such as data sensitivity and data confidentiality. Furthermore, the AI-ML monitoring engine may identify drift in data distribution.

The dynamic model aggregation engine 502, may first identify AI-ML model components 504. The components may be one or more AI-ML components that may be required for an AI-ML model, such as an image processing component, a misappropriation requirement, or the like. Next, the system may analyze the AI-ML components, as illustrating in block 506. In this way, the system may review and analyze the components and confirm the host environment associated with the components.

As illustrated in block 508, the process 500 continues by annotating the model components based on complexity. In this way, the system identifies the more complex components that require more CPU or the like and directs them to the appropriate host environment. Next, as illustrated in block 510 the system mints NFT for model components. Minted model component NFT include a proof of ownership on model component and host path where model component binary files and programs is located.

As illustrated in block 514, the process continues by managing the NFTs through smart contracts. In this way, model components are distributed to host environments in such a way to optimize performance of aggregated model and are guided by the smart contract rules for completion of the segment of the model. Finally, as illustrated in block 516, the process 500 is completed by releasing the model NFT.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a secure de-centralized execution of machine learning activity, the system comprising:

a processing device;

a non-transitory storage device containing computer program code comprising computer instructions that, when executed, cause the processing device to:

identify machine learning and artificial intelligence (AI-ML) model components and cluster the AI-ML model components based on performance output requirements;

annotate and index AI-ML model components;

distribute each AI-ML model component to one or more host devices across a distributed network based on a performance output requirements match of the one or more host devices and each AI-ML model component;

mint a non-fungible token (NFT) for the AI-ML model component, wherein minting the NFT further comprises storing metadata information on a host path for proof of ownership validation via a distributed ledger;

receive a request for an AI-ML model from a user;

identify a plurality of AI-ML model components from an AI-ML component NFT wallet for the AI-ML model requested from the user;

validate NFT and aggregate the plurality of AI-ML model components;

connect to a distributed ledger and extract the plurality of AI-ML model components to assemble the AI-ML model;

execute, in response to connecting to the distributed ledger and extracting the AI-ML model components, the model program using the plurality of AI model components at the one or more host device; and maintain smart contract for each NFT across the AI-ML model components containing smart contract rules to guide the AI-ML model component completion of a segment at the one or more host devices.

2. The system of claim 1, wherein distributing the AI-ML model component to one or more host devices further comprises running the AI-ML model component on the host device using host device computer resources.

3. The system of claim 1, wherein distributing the AI-ML model component to one or more host devices further comprises distribution to the host device based on performance impact of the host device running the AI-ML model component.

4. The system of claim 1, wherein minting the NFT for the AI-ML model component further comprises tagging the AI-ML model component with the NFT for authentication and tampering verification.

5. The system of claim 1, wherein aggregating the one or more AI-ML model components for execution of model program at the one or more host devices further comprises transmitting metadata about the AI-ML model, a binary file, and information about a target hardware to perform the AI-ML model component function on the host device.

6. The system of claim 1, wherein the distributed ledger comprises a string of NFTs to aggregate the AI-ML model components, AI-ML model programs, and AI-ML binary files in real-time for the AI-ML model performance.

7. A computer program product for a secure de-centralized execution of machine learning activity with at least one non-transitory computer-readable medium having computer-readable program code portions embodied therein, the computer-readable program code portions comprising:

an executable portion configured for identifying machine learning and artificial intelligence (AI-ML) model components and clustering the AI-ML model components based on performance output requirements;

an executable portion configured for annotating and indexing AI-ML model components;

an executable portion configured for distributing the each AI-ML model component to one or more host devices across a distributed network based on a performance output requirements match of the one or more host devices and the each AI-ML model component;

an executable portion configured for minting a non-fungible token (NFT) for the AI-ML model component, wherein minting the NFT further comprises storing metadata information on a host path for proof of ownership validation via a distributed ledger;

an executable portion configured for receiving a request for an AI-ML model from a user;

an executable portion configured for identifying a plurality of AI-ML model components from an AI-ML component NFT wallet for the AI-ML model requested from the user;

an executable portion configured for validating NFT and aggregating the plurality of AI-ML model components;

an executable portion configured for connecting to a distributed ledger and extract the plurality of AI-ML model components to assemble the AI-ML model;

an executable portion configured for executing, in response to connecting to the distributed ledger and extracting the AI-ML model components, the model program using the plurality of AI model components at the one or more host devices; and an executable portion configured for maintaining smart contract for each NFT across the AI-ML model component containing smart contract rules to guide the AI-ML model component completion of a segment at the one or more host devices.

8. The computer program product of claim 7, wherein distributing the AI-ML model component to one or more host devices further comprises running the AI-ML model component on the host device using host device computer resources.

9. The computer program product of claim 7, wherein distributing the AI-ML model component to one or more host devices further comprises distribution to the host device based on performance impact of the host device running the AI-ML model component.

10. The computer program product of claim 7, wherein minting the NFT for the AI-ML model component further comprises tagging the AI-ML model component with the NFT for authentication and tampering verification.

11. The computer program product of claim 7, wherein aggregating the one or more AI-ML model components for execution of model program at the one or more host devices further comprises transmitting metadata about the AI-ML model, a binary file, and information about a target hardware to perform the AI-ML model component function on the host device.

12. The computer program product of claim 7, wherein the AI-ML model component is one of one or more components in an AI-ML model.

13. The computer program product of claim 7, wherein the distributed ledger comprises a string of NFTs to aggregate the AI-ML model components, AI-ML model programs, and AI-ML binary files in real-time for the AI-ML model performance.

14. A computer-implemented method for a secure decentralized execution of machine learning activity, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

identifying machine learning and artificial intelligence (AI-ML) model components and clustering the AI-ML model components based on performance output requirements;

18 annotating and indexing AI-ML model components;

distributing each AI-ML model component to one or more host devices across a distributed network based on a performance output requirements match of the one or more host devices and each the AI-ML model component;

minting a non-fungible token (NFT) for the AI-ML model component, wherein minting the NFT further comprises storing metadata information on a host path for proof of ownership validation via a distributed ledger;

receiving a request for an AI-ML model from a user;

identifying a plurality of AI-ML model components from an AI-ML component NFT wallet for the AI-ML model requested from the user;

validating NFT and aggregating the plurality of AI-ML model components;

connecting to a distributed ledger and extract the plurality of AI-ML model components to assemble the AI-ML model;

executing, in response to connecting to the distributed ledger and extracting the AI-ML model components, the model program using the plurality of AI model components at the one or more host devices; and maintaining smart contract for each NFT across the AI-ML model component containing smart contract rules to guide the AI-ML model component completion of a segment at the one or more host devices.

15. The computer-implemented method of claim 14, wherein distributing the AI-ML model component to one or more host devices further comprises running the AI-ML model component on the host device using host device computer resources.

16. The computer-implemented method of claim 14, wherein distributing the AI-ML model component to one or more host devices further comprises distribution to the host device based on performance impact of the host device running the AI-ML model component.

17. The computer-implemented method of claim 14, wherein minting the NFT for the AI-ML model component further comprises tagging the AI-ML model component with the NFT for authentication and tampering verification.

18. The computer-implemented method of claim 14, wherein aggregating the one or more AI-ML model components for execution of model program at the one or more host devices further comprises transmitting metadata about the AI-ML model, a binary file, and information about a target hardware to perform the AI-ML model component function on the host device.

19. The computer-implemented method of claim 14, wherein the distributed ledger comprises a string of NFTs to aggregate the AI-ML model components, AI-ML model programs, and AI-ML binary files in real-time for the AI-ML model performance.

20. The system of claim 1, wherein the plurality of AI-ML model components are distributed on a plurality of host devices.

* * * * *